United States Patent
Su

(10) Patent No.: US 8,502,652 B2
(45) Date of Patent: Aug. 6, 2013

(54) BICYCLE BRAKE DEVICE HAVING A WARNING FUNCTION

(75) Inventor: Wei-Chung Su, Taichung (TW)

(73) Assignee: Canknow International Ind. Co., Ltd., Taichung (TW)

( * ) Notice: Subject to any disclaimer, the term of this patent is extended or adjusted under 35 U.S.C. 154(b) by 261 days.

(21) Appl. No.: 13/048,533

(22) Filed: Mar. 15, 2011

(65) Prior Publication Data

US 2012/0194331 A1   Aug. 2, 2012

(30) Foreign Application Priority Data

Feb. 1, 2011 (TW) .............................. 100103872 A

(51) Int. Cl.
*B62J 3/00* (2006.01)

(52) U.S. Cl.
USPC .......................................... 340/432; 340/468

(58) Field of Classification Search
USPC ............ 340/432, 468, 479; 188/24.12, 24.22, 188/24.15
See application file for complete search history.

(56) References Cited

U.S. PATENT DOCUMENTS 3,906,443 A * 9/1975 Musselman ................... 340/432
6,933,836 B2 * 8/2005 Hsu .............................. 340/432

FOREIGN PATENT DOCUMENTS

TW      553149      9/2003

* cited by examiner

*Primary Examiner* — Toan N Pham
(74) *Attorney, Agent, or Firm* — Muncy, Geissler, Olds & Lowe, PLLC

(57) ABSTRACT

A bicycle brake device includes a brake shoe, a warning device installed in the brake shoe, a power supply device electrically connected with the warning device, and two conductors separately mounted in the brake shoe and respectively electrically connected with the warning device and the power supply device. Each conductor has one end thereof exposed to the outside of the brake shoe for touching the wheel rim or brake disc of the bicycle upon a brake operation to close the circuit, causing the warning device to generate a warning signal.

14 Claims, 9 Drawing Sheets

BICYCLE BRAKE DEVICE HAVING A WARNING FUNCTION

BACKGROUND OF THE INVENTION

1. Field of the Invention

The present invention relates to bicycle brake technology and more particularly, to a bicycle brake device having a warning function.

2. Description of the Related Art

Taiwan Patent 553149 discloses a brake light for bicycle, which comprises a brake shoe and a light-emitting unit. The brake shoe is affixed to a brake arm and movable with the brake arm, comprising a touch rod. The light-emitting unit comprises a battery and a warning device. The battery is mounted in the brake shoe, having two opposite terminals. The warning device is mounted in one side of the brake shoe, having one contact pin thereof electrically connected with one terminal of the battery. When the brake shoe is moved by the brake arm to force the resilient touch rod into contact with the wheel rim, the touch rod will force the other contact pin of the warning device into contact with the other terminal of the battery. At this time, the battery is electrically connected to provide battery power to the warning device, causing the warning device to give off light for warning.

In the aforesaid prior art design, the touch rod of the brake shoe has a rib connected to an annular groove at the brake shoe so that the touch rod is elastically movable in the annular groove. When the touch rod touches the wheel ring, it will be forced backwards to push the other contact pin of the warning device. According to this design, the touch rod is not affixed to the brake shoe. Thus, the touch rod tends to be biased by an external force. If the touch rod is improperly biased, it may be unable to positively push the respective contact pin of the warning device, resulting in a contact error.

SUMMARY OF THE INVENTION

The present invention has been accomplished under the circumstances in view. It is the main object of the present invention to provide a bicycle brake device having a warning function, which provides an excellent electric contact effect for generating a warning signal positively.

To achieve this and other objects of the present invention, a bicycle brake device comprises a brake shoe, a warning device, a power supply device and two conductors. The brake shoe is connected to a brake caliper and movable with the brake caliper. The warning device is adapted for generating a warning signal. The power supply device is electrically connected with the warning device for providing the warning device with the necessary working power. The conductors are separately mounted in the brake shoe and respectively electrically connected with the warning device and the power supply device. Each conductor has one end thereof exposed to the outside of the brake shoe. When the brake shoe are moved with the brake caliper and pressed on a wheel rim or brake disc of the bicycle, the conductors are electrically connected, causing the warning device to generate a warning signal, achieving a warning effect.

DETAILED DESCRIPTION OF THE INVENTION

Figure 1:
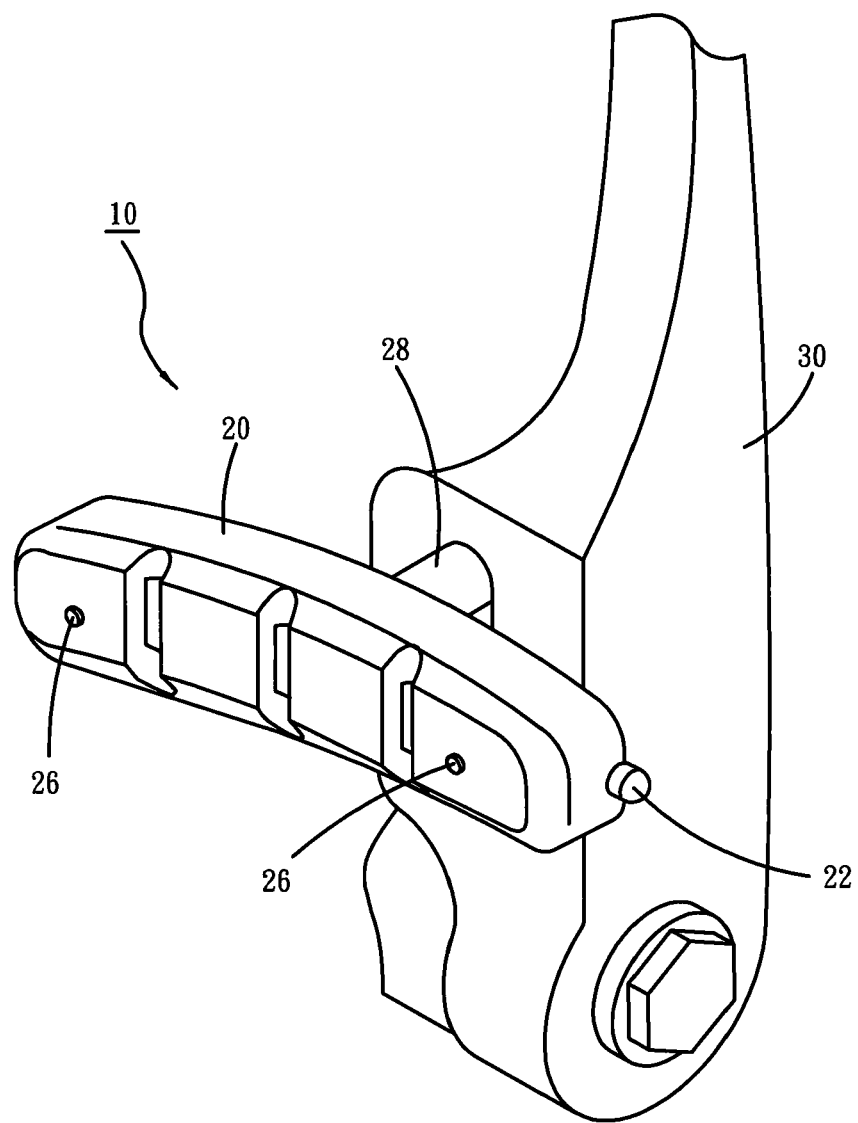
FIG. 1 is an elevational view of a bicycle brake device in accordance with a first embodiment of the present invention.

Referring to FIG. 1, a bicycle brake device 10 in accordance with a first embodiment of the invention is shown comprising a brake shoe 20, a warning device 22, a power supply device 24 (see FIG. 2) and two conductors 26.

Figure 4:
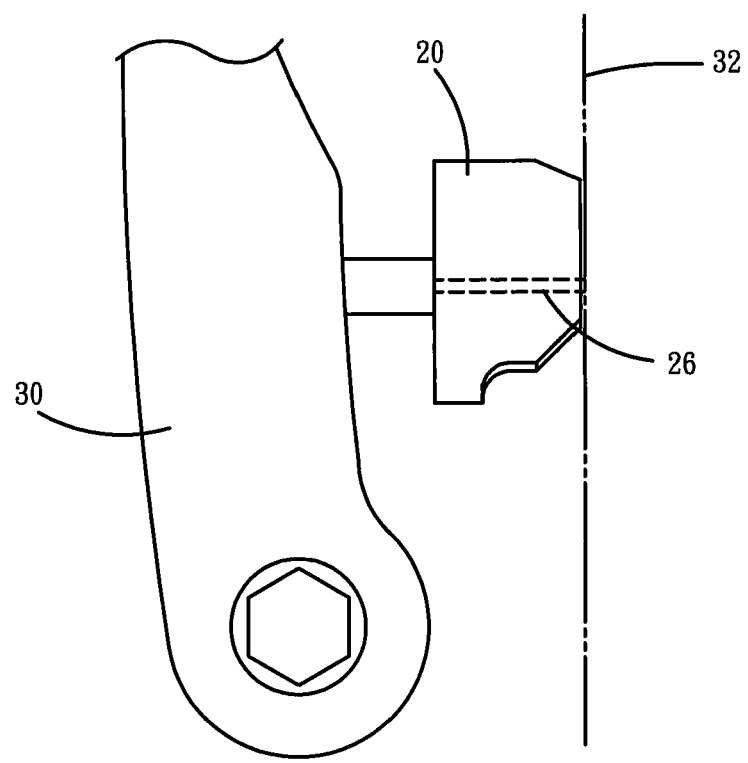
FIG. 4 is a schematic drawing illustrating an operation status of the bicycle brake device in accordance with the first embodiment of the present invention.

The brake shoe 20 is fixedly fastened to a brake caliper 30 by a connection rod 28, and movable with the brake caliper 30 toward a wheel rim 32 (see FIG. 4).

The warning device 22 can be a light-emitting diode or buzzer. According to this embodiment, the warning device 22 is a light-emitting diode installed in a rear end of the brake shoe 20 and exposed to the outside of the brake shoe 20.

Figure 2:
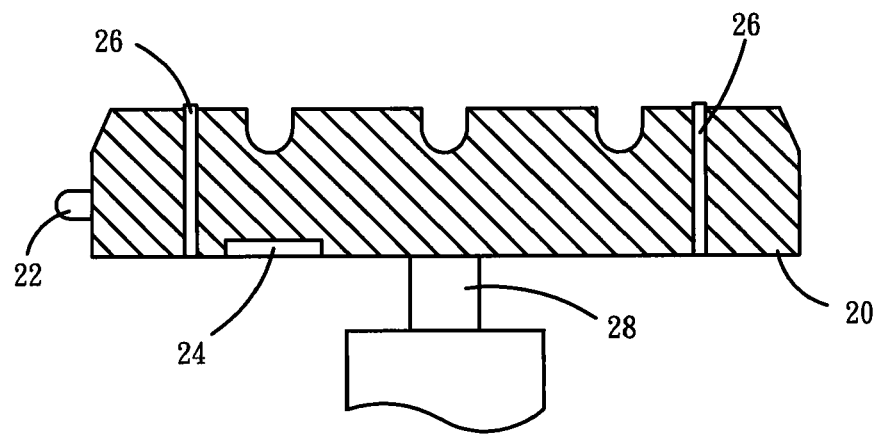
FIG. 2 is a sectional view of the bicycle brake device in accordance with the first embodiment of the present invention.

The power supply device 24 according to this embodiment is a built-in battery set inside the brake shoe 20, as shown in FIG. 2, and electrically connected with the warning device 22 by an electric wire for providing the warning device 22 with the necessary working power.

Figure 3:
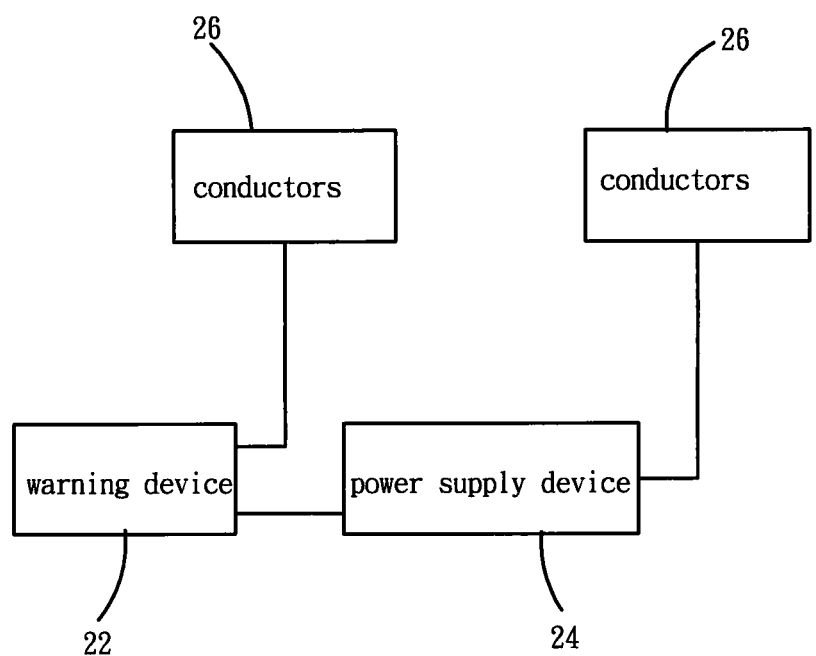
FIG. 3 is a circuit block diagram of the bicycle brake device in accordance with the first embodiment of the present invention.
Figure 5:
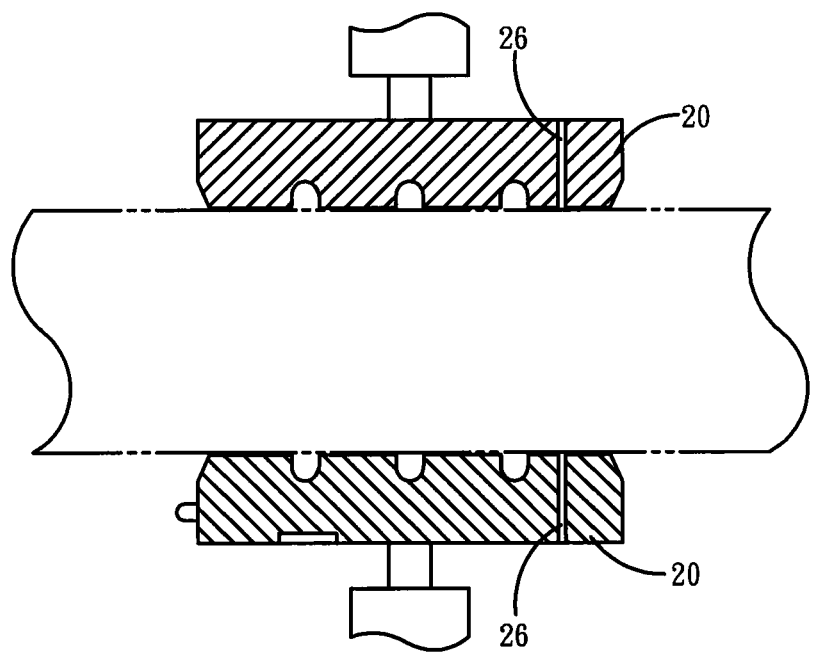
FIG. 5 is a sectional view of a bicycle brake device in accordance with a second embodiment of the present invention.

The conductors 26 according to this embodiment are tin rods fixedly mounted in the brake shoe 20 and spaced from each other at a distance, each having one end thereof exposed to the surface of the brake shoe 20. As shown in FIG. 3, one conductor 26 is electrically connected with the warning device 22 by an electric wire, and the other conductor 26 is electrically connected with the power supply device 24 by an electric wire. Arranging the two conductors 26 in one same brake shoe 20 is not a limitation. Alternatively, as shown in FIG. 5, the two conductors 26 can be respectively installed in one respective brake shoe 20.

Figure 6:
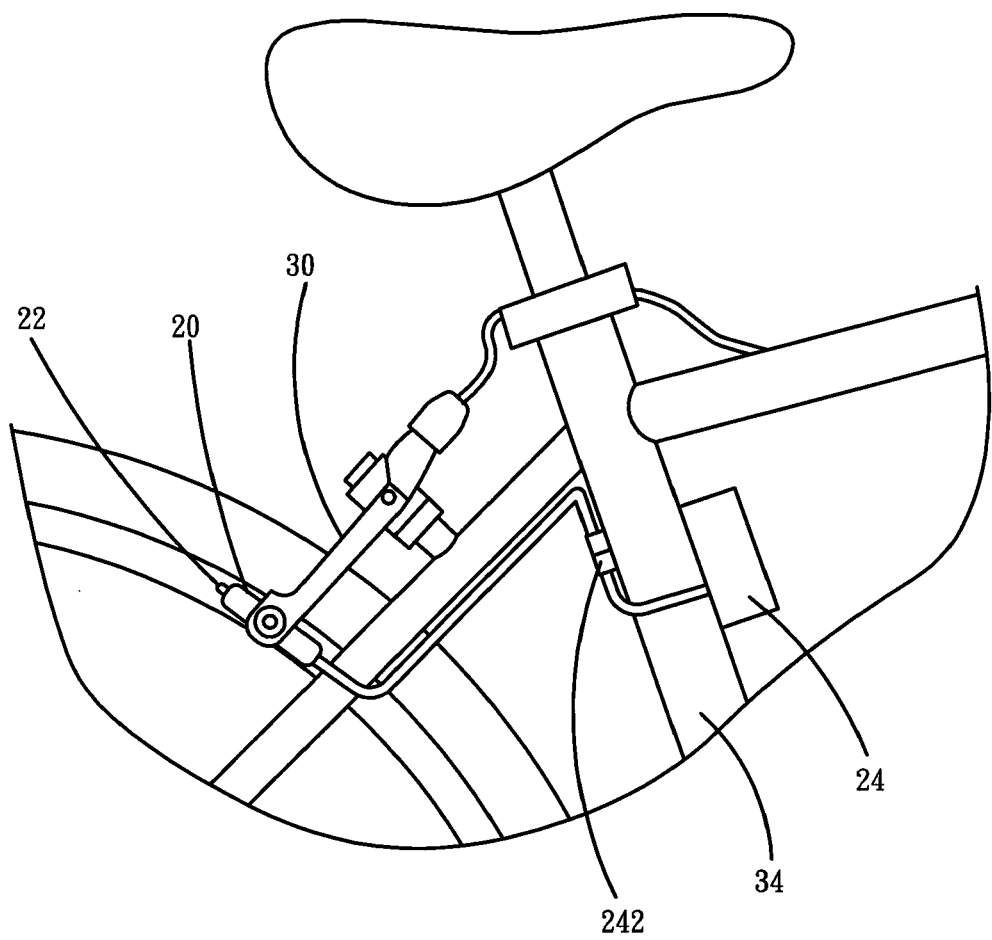
FIG. 6 is a schematic drawing illustrating a bicycle brake device installed in a bicycle in accordance with a third embodiment of the present invention.
Figure 7:
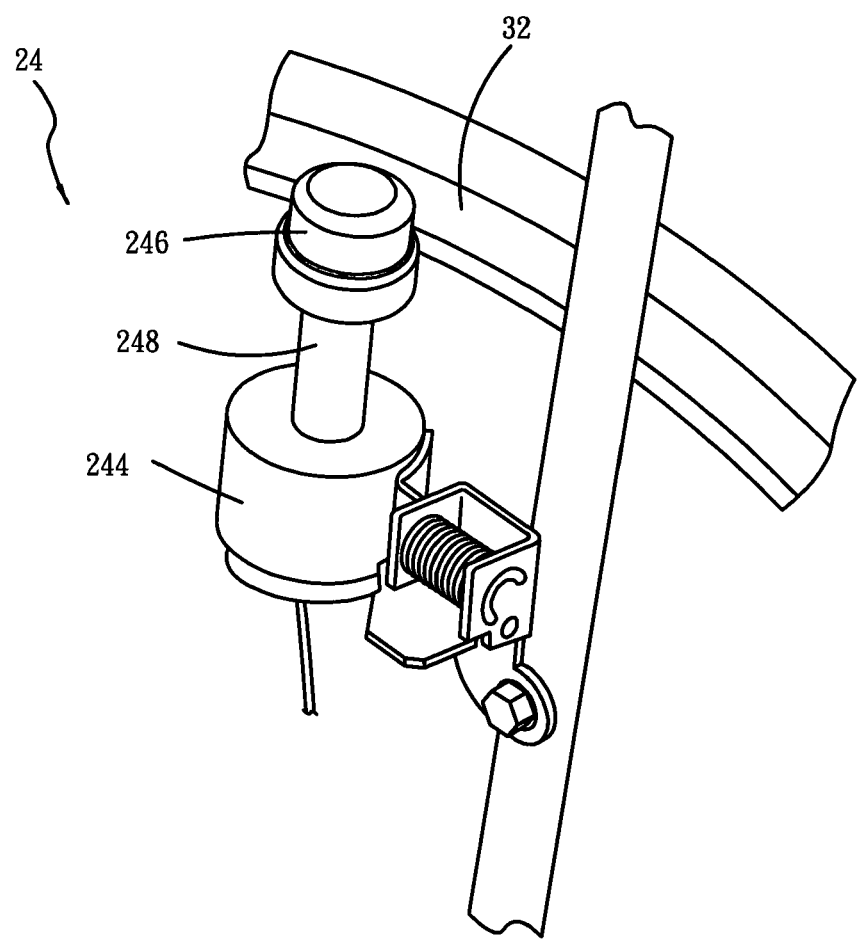
FIG. 7 is an elevational view of a power supply device for a bicycle brake device in accordance with a fourth embodiment of the present invention.
Figure 8:
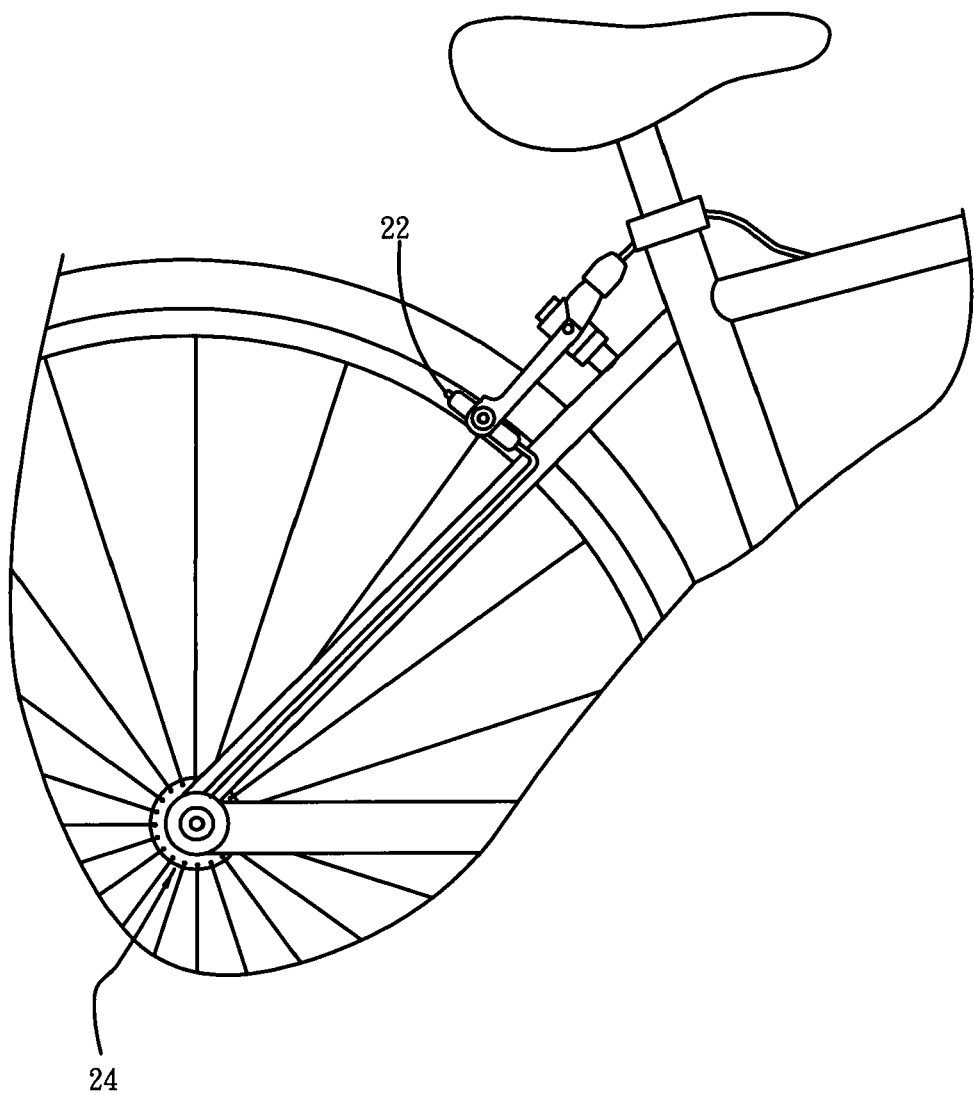
FIG. 8 is a schematic drawing illustrating an operation status of a bicycle brake device in accordance with a fifth embodiment of the present invention.

When the user operates the brake, the brake shoe 20 is moved with the brake caliper 30 toward the wheel rim 32 and then pressed on the wheel rim 32. At this time, a friction force is produced between the brake shoe 20 and the wheel rim 32 to achieve a braking effect. At the same time, as shown in FIG. 4, the exposed end of each conductor 26 is kept in contact with the wheel rim 32 that is normally made of an electrically conductive material (such as metal, carbon fiber or any other electrically conductive material), and therefore the warning device 22, the power supply device 24, the conductors 26 and the wheel rim 32 are electrically connected, causing the warning device 22 to give off light (or to buzz). Therefore, a visual (or audio) warning signal is produced when the user operates the brake to stop the bicycle, enhancing bicycle-riding safety. Further, the power supply device 24 is not limited to the aforesaid built-in battery design. Alternatively, as shown in FIG. 6, the power supply device 24 can be a detachable battery mounted on the frame 34 of the bicycle and electrically connected with the warning device 22 and the conductors 26 by a connection interface 242. Thus, the brake device 10 can use the warning device 22 to achieve a warning effect, and allows replacement of the power supply device 24 when the power supply device 24 fails. Therefore, the invention facilitates application and maintenance. Alternatively, the power supply device 24 can be a friction-driven dynamo as shown in FIG. 7, or a hub dynamo as shown in FIG. 8. According to the embodiment shown in FIG. 7, the power supply device 24 is a friction-driven dynamo comprising a dynamo body 244 and a wheel rotor 246. The dynamo body 244 is electrically connected with the warning device 22 and the conductors 26, comprising an armature 248. The wheel rotor 246 is connected to the armature 248 of the dynamo body 244 and kept in contact with the wheel rim 32 of the bicycle. When the wheel rim 32 is rotated, the wheel rotor 246 is synchronously driven to rotate, and therefore the armature 248 of the dynamo body 244 is rotated with the wheel rotor 246 to drive the dynamo body 244 in generating electricity for the warning device 22. According to the embodiment shown in FIG. 8, the power supply device 24 is a hub dynamo that generates electricity for the warning device 22 during rotation of the wheel rim 32. Further, the electricity generated by the power supply device 24 can be stored in a storage battery and then provided to the warning device 22 by the storage battery.

Figure 9:
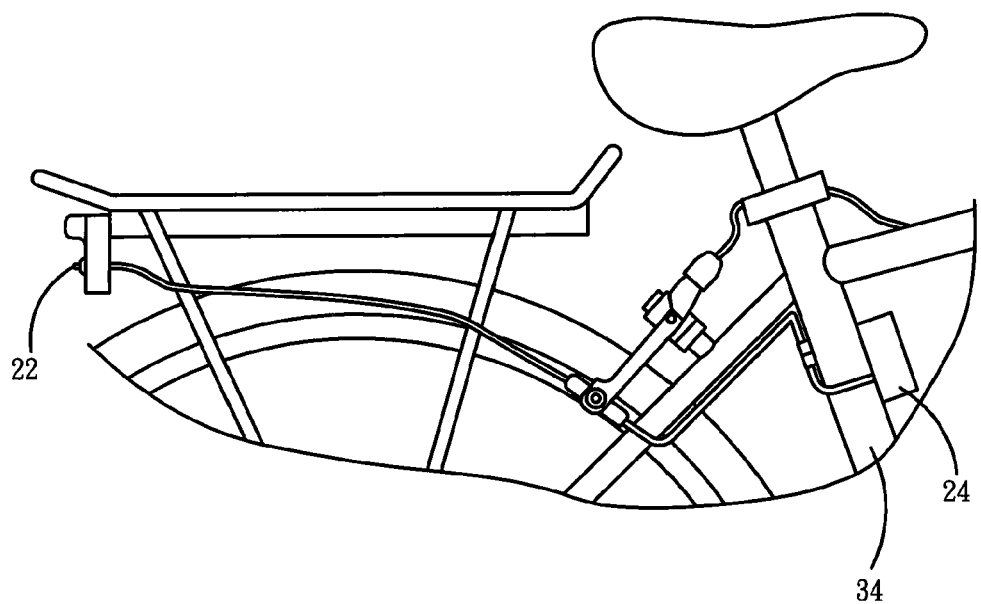
FIG. 9 is a schematic drawing illustrating an operation status of a bicycle brake device in accordance with a sixth embodiment of the present invention.
Figure 10:
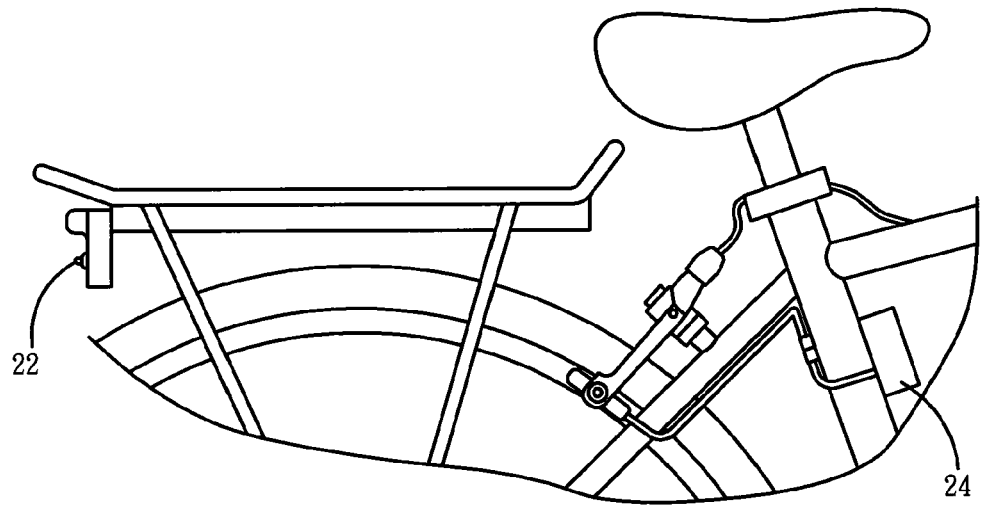
FIG. 10 is a schematic drawing illustrating an operation status of a bicycle brake device in accordance with a seventh embodiment of the present invention.
Figure 11:
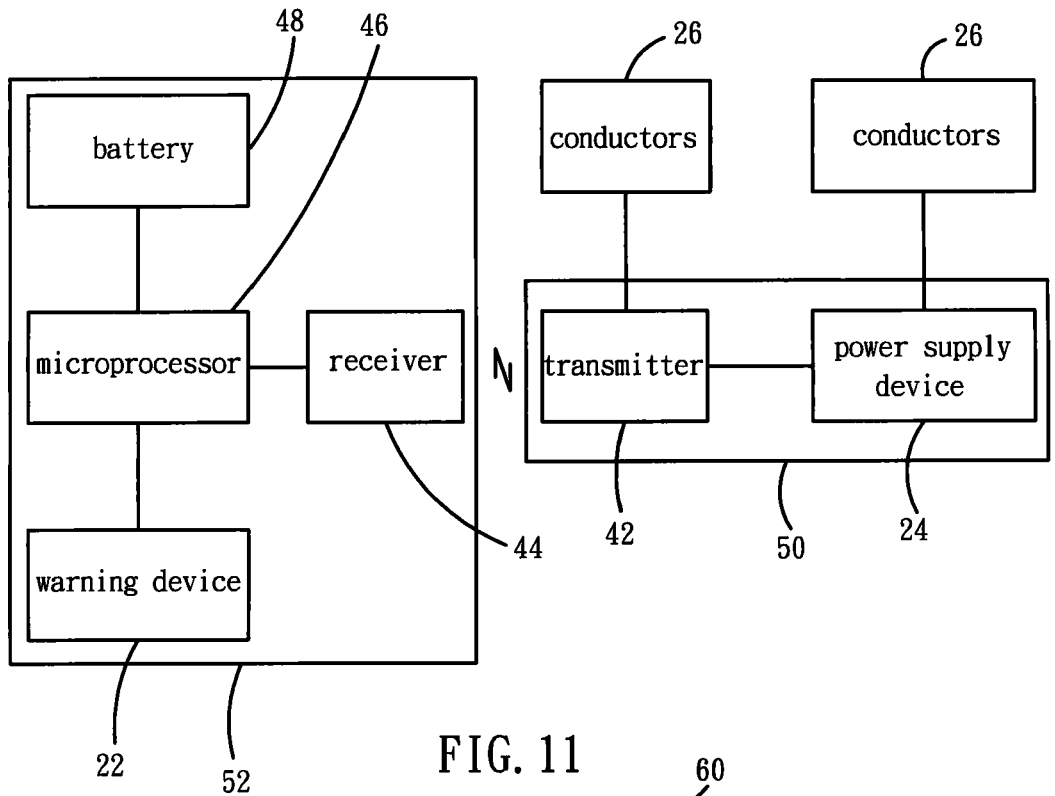
FIG. 11 is a circuit block diagram of the bicycle brake device in accordance with the seventh embodiment of the present invention.

Further, the arrangement of mounting the warning device 22 in the rear end of the brake shoe 20 is not a limitation. Alternatively, the warning device 22 can be mounted on the frame 34 of the bicycle near the rear side of the bicycle, and electrically connected with the power supply device 24 by a wired method as shown in FIG. 9, or a wireless method as shown in FIG. 10. When a wireless method is adopted, RFID (radio frequency identification) technology is employed to transmit a brake signal. In this case, as shown in FIG. 11, the brake device 10 further comprises a transmitter 42, a receiver 44, a microprocessor 46 and a battery 48. The transmitter 42 is electrically connected with one conductor 26 and the power supply device 24, and integrated with the power supply device 24 to form a power supply unit 50 that is mounted on the frame 34 of the bicycle. The receiver 44 is electrically connected with the battery 48 and the warning device 22 by means of the microprocessor 46, and integrated with the microprocessor 46, the battery 48 and the warning device 22 to form a warning unit 52. The warning unit 52 can be mounted on the frame 34 of the bicycle, an attached part of the bicycle, or a personal item carried by the bicycle rider. Thus, when the exposed end of each conductor 26 touches the wheel rim 32, the transmitter 42 will be driven to transmit a brake signal to the receiver 44, and the receiver 44 will transmit the signal to the microprocessor 46, causing the microprocessor 46 to drive the warning device 22 in generating a warning signal.

Figure 12:
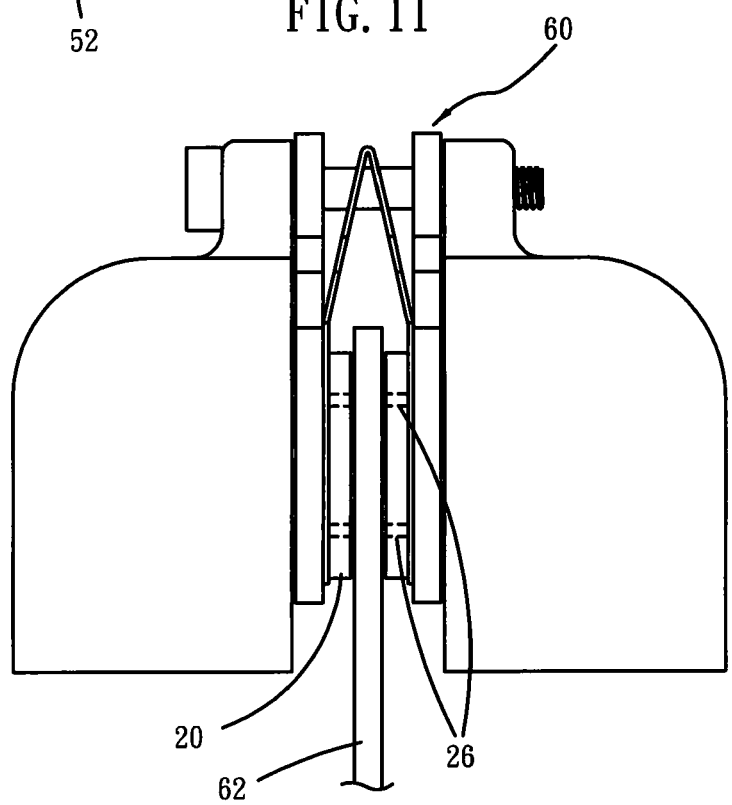
FIG. 12 is a schematic drawing illustrating an operation status of a bicycle brake device in accordance with an eighth embodiment of the present invention.

The brake device 10 is not limited to the aforesaid rim brake design. Alternatively, the brake device 10 can be a disc brake, as shown in FIG. 12. According to this disc brake design, the brake shoes 20 are mounted on the respective disc brake calipers 60 and movable with the respective disc brake caliper 60 to abut against the brake disc 62. When the brake shoes 20 are abutted against the brake disc 62, the conductors 26 in the brake shoes 20 are forced into contact with the brake disc 62, and therefore the circuit in the brake shoes 20 is closed, causing the warning device 22 to generate a warning signal.

In conclusion, the conductors of the brake device in accordance with the present invention are fixedly mounted in the brake shoe(s) for positive connection by the wheel rim or brake disc of the bicycle, avoiding any contact error and assuring high reliability.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle brake device, comprising:
at least one brake shoe;
a warning device;
a power supply device electrically connected with said warning device; and
two conductors installed in said at least one brake shoe and respectively electrically connected with said warning device and said power supply device, each said conductor having one end thereof exposed to the outside of the surface of said at least one brake shoe.

2. The bicycle brake device as claimed in claim 1, wherein said warning device is mounted in one end of said at least one brake shoe.

3. The bicycle brake device as claimed in claim 2, wherein said power supply device is a battery built in said at least one brake shoe and electrically connected with said warning device by a wired method.

4. The bicycle brake device as claimed in claim 2, wherein said power supply device is a detachable battery electrically connected with said warning device and said conductors by a connection interface.

5. The bicycle brake device as claimed in claim 1, wherein said warning device is mounted in a bicycle frame.

6. The bicycle brake device as claimed in claim 5, wherein said power supply device is a detachable battery electrically connected with said warning device and said conductors by a connection interface.

7. The bicycle brake device as claimed in claim 6, wherein said power supply device is mounted on a bicycle frame.

8. The bicycle brake device as claimed in claim 5, wherein said power supply device is a detachable battery electrically connected with said warning device by a wireless connection method.

9. The bicycle brake device as claimed in claim 8, further comprising a transmitter, a receiver, a microprocessor and a battery, said transmitter being electrically connected with one said conductor and said power supply device and integrated with said power supply device to form a power supply unit mounted on a bicycle frame, said receiver being electrically connected with said battery and said warning device by means of said microprocessor and integrated with said microprocessor, said battery and said warning device to form a warning unit, said warning unit being selectively mountable on said bicycle frame, an attached part of the bicycle or a personal item carried by a person riding the bicycle.

10. The bicycle brake device as claimed in claim 1, wherein said power supply unit is a friction-driven dynamo.

11. The bicycle brake device as claimed in claim 1, wherein said power supply unit is a hub dynamo.

12. The bicycle brake device as claimed in claim 1, wherein said at least one brake shoe is connected to a bicycle brake caliper by a connection rod.

13. The bicycle brake device as claimed in claim 1, wherein said conductors are tin rods.

14. The bicycle brake device as claimed in claim 1, wherein the number of said at least one brake shoe is 2, and said conductors are respectively mounted in the two brake shoes.

* * * * *